United States Patent Office 3,342,095
Patented Sept. 19, 1967

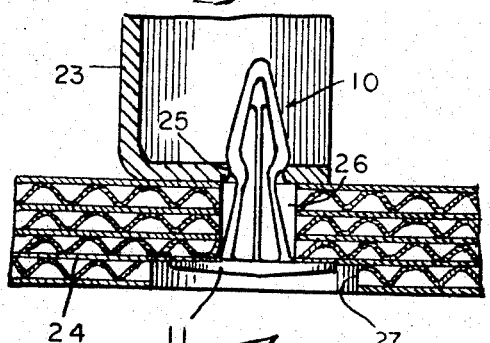
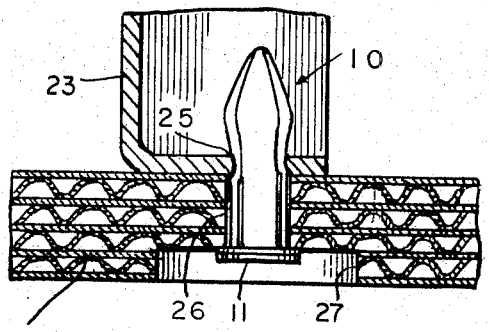
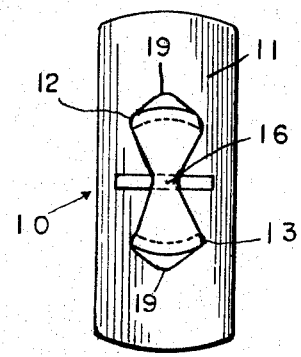
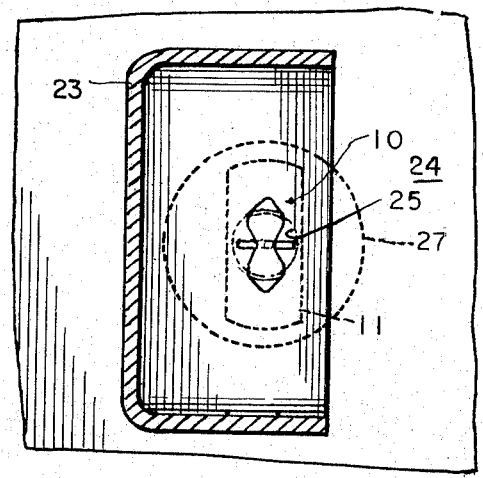
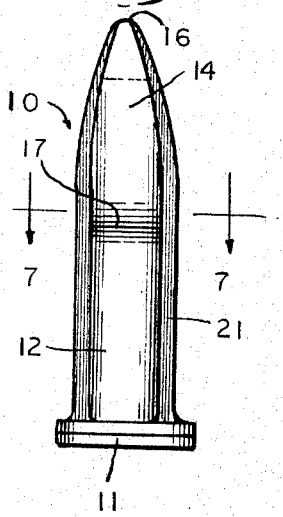
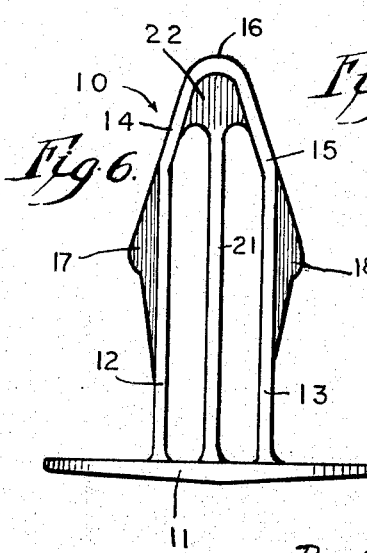
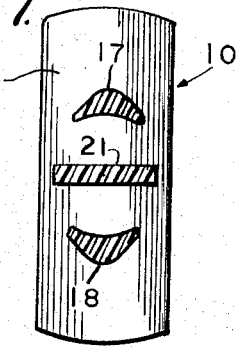

3,342,095
SNAP-IN FASTENER
Robert Z. Buntic, Elmhurst, Ill., assignor to National Lock Co., Rockford, Ill., a corporation of Delaware
Filed Mar. 5, 1965, Ser. No. 437,429
5 Claims. (Cl. 85—5)

The present invention relates to a novel fastener and more particularly to a snap-in fastener formed of a suitable plastic material which is especially useful where two parts have to be joined with one side inaccessible or where a metal fastener would be exposed to corrosion.

Among the objects of the present invention is the provision of a novel drive fastener which is particularly useful in joining two parts together where one side is not accessible. The fastener is preferably formed of a suitable plastic material which may be compressed but, due to its resiliency, will tend to return to its original shape and form. The fastener is formed with an enlarged central portion which is slightly larger than the hole in the articles being joined. When the fastener is inserted into the hole or opening, the fastener must be partially compressed at its largest cross section to pass through the opening, and then the memory of the plastic returns the fastener to its original shape to retain the fastener in the opening and hold the parts to be joined together.

Another object of the present invention is the provision of a snap-in fastener formed of a suitable plastic material for use where a metal fastener would be subject to corrosion. Such corrosion could occur where the fastener would be exposed to exterior atmospheric conditions or where a corrosive atmosphere is created due to acids, alkali or like corrosive substances or influences.

A further object of the present invention is the provision of a novel fastener construction having a head or base, two spaced flanges and a center bar therebetween, all extending from the head and connected at the tip of the fastener. The two flanges are tapered in such a way that they will collapse if driven into a hole slightly smaller than the largest cross section or diameter of the flange. The resiliency of the plastic material will tend to return the plastic to its original shape after the high point of the flange has passed through the hole or opening.

The present invention also comprehends the provision of a novel fastener construction having a center bar extending between a base and joining two spaced flanges at a reduced or pointed tip; which center bar acts similar to a torsion bar to resist deformation of the fastener. The center bar acts constantly to limit the collapse of the two spaced flanges where the fastener is inserted into an opening.

The present invention further comprehends the provision of a snap-in fastener formed of a suitable plastic composition where the coefficient of thermal expansion and contraction of the plastic is fairly high. The center bar will equalize the contraction of the fastener when exposed to cold weather conditions. The center bar, which will contract due to the cold, will pull up the two flanges and keep a continuous pressure against the side walls of the hole or opening to prevent the fastener from becoming loose in the hole. Exposed to heat, the expansion of the plastic material will take care of continuous pressure applied by the fastener on the side walls of the hole or opening in the two parts being joined.

Further objects are to provide a construction of maximum simplicity, efficiency, economy and ease of operation, and such further objects, advantages and capabilities as will later more fully appear and are inherently possessed thereby.

In the drawing:

FIGURE 1 is a front elevational view showing the snap-in fastener in operative position joining two parts together, with the two parts being shown in cross section.

FIG. 2 is a side elevational view of the snap-in fastener similar to FIG. 1.

FIG. 3 is a top plan view of the snap-in fastener alone.

FIG. 4 is a top plan view of the fastener in operative position when joining two parts together.

FIG. 5 is a side elevational view of the snap-in fastener alone.

FIG. 6 is a front elevational view of the fastener.

FIG. 7 is a horizontal cross sectional view of the fastener taken on the line 7—7 of FIG. 5.

Referring more particularly to the drawing wherein is disclosed an illustrative embodiment of the present invention, FIGS. 5 and 6 disclose a drive fastener 10 formed of a suitable plastic material, such as nylon. This fastener includes an enlarged head or base 11 with a pair of spaced, slightly outwardly curved side flanges 12 and 13 extending upward from the base, with the flanges having inclined portions 14 and 15 for the upper approximately one-third of the length of each flange. The inclined portions 14 and 15 merge into a pointed nose or tip 16; the tip being substantially smaller than the lower portions of the flanges, as the inclined portions 14 and 15 also have converging edges as clearly seen in FIGS. 3 and 5.

Each flange 12 and 13 on the vertical portion adjacent the inclined portion 14 and 15 has an enlargement or protuberance 17 and 18, respectively, with each enlargement tapering into its associated flange in a vertical direction (FIG. 6) and also tapering in a horizontal direction from a crest 19 (FIG. 3) to merge into its associated flange. These enlargements aid in retaining the fastener in securing position joining two parts together as later described.

A center bar 21 also extends upward from the base 11 and joins the flanges 12, 13 at the tip 16 through a connecting web portion 22 extending between the flanges at the tip 16. The bar 21 is spaced directly between the flanges and tapers with converging edges at its upper end to the width of the tip or nose 16 (FIG. 5). The width of the center bar may be greater than the width of the side flanges but less than the maximum diameter of the flanges.

FIGS. 1, 2 and 4 disclose the fastener 10 in operative relationship joining two parts 23 and 24. The part 23 has an opening 25 slightly smaller than the maximum cross section or diameter of the flanges 12, 13 or the maximum width of the center bar 21. The part 24 has an opening 26 of a diameter to receive the fastener, with the opening being enlarged or counterbored at 27 to receive the base or head 11.

To join the parts 23 and 24 together, the openings 25 and 26 are substantially aligned and the tip 16 of the fastener 10 is inserted in the openings 26 and 25. Pressure on the head 11 urges the driven fastener through the openings until stopped by engagement of the head 11 with the part 24 in the counterbore 27. As the cross section or diameter of the opening 25 is slightly less than the maximum cross section or diameter of the flanges 12 and 13, when the enlargements 17 and 18 enter opening 25, the flanges are compressed inwardly and will partially collapse when driven into the hole 25. After the high point or crest 19 of the enlargements 17 and 18 is passed, the resiliency or memory of the plastic material will cause the fastener to tend to return to its original shape; said resiliency to return to the original shape being limited by the diameter or size of the opening 25. It is noted that in FIGS. 1 and 2, both the flanges 12 and 13 and the center bar 21 are partially compressed to securely retain the fastener 10 in position joining the two parts 23 and 24 together.

Another advantage of the fastener 10 is that the coefficient of thermal expansion and contraction of substantially all plastic materials is fairly high compared to most other materials such as metals, etc. Thus, when exposed to heat, the expansion of the plastic material will take care of the continuous pressure required to retain the fastener in position joining the parts 23 and 24 together. Also, when exposed to cold weather conditions where the plastic material has the tendency to contract, the center bar 21 will equalize the contraction of the flanges 12 and 13. The center bar will contract when exposed to the cold and will pull up the two flanges 12 and 13 to keep a continuous pressure against the side walls of the opening 25 preventing the fastener from becoming loose in the opening.

Having disclosed the invention, I claim:

1. A resilient plastic snap-in fastener comprising an enlarged head, a center bar extending upward from the head and terminating in a pointed tip, the center bar tapering adjacent the tip to a narrow end, and a pair of flanges spaced from and positioned on opposite sides of said center bar, said flanges extending upward from the head parallel to the center bar and then converging and tapering to the pointed tip, each flange including an outwardly extending enlargement intermediate the length of the flange and each enlargement tapering vertically upward and downward to merge into said flange and also tapering horizontally to merge into the opposite edges of the flanges.

2. A resilient plastic snap-in fastener as set forth in claim 1, in which the maximum cross section of said flanges and enlargements is slightly greater than the cross section of an opening in a part receiving the fastener.

3. A resilient plastic snap-in fastener comprising an enlarged head, a center bar centrally positioned on and transversely of said head, said bar extending upwardly from and perpendicular to said head, a pointed tip opposite said head, said bar having parallel edges which converge adjacent to and merge into a web portion below the pointed tip, a flange spaced from and located on either side of said bar, with the flange transversely curved outwardly from said bar, said flanges extending upwardly parallel to the center bar and then converging adjacent the tip to merge thereinto, said flanges having parallel edges which converge adjacent to the tip to form a pointed tip portion, and an enlargement on each flange outwardly thereof and located intermediate the head and tip.

4. A resilient plastic snap-in fastener comprising a base, a center bar extending upward from the base and tapering to a pointed tip, and a pair of flanges spaced from and positioned on opposite sides of the center bar and extending upward from said base and converging and tapering to the pointed tip, each flange including an intermediate outwardly extending enlargement with each enlargement tapering vertically upward and downward and horizontally from a crest to merge into the flange.

5. A resilient plastic snap-in fastener as set forth in claim 4, in which each flange is transversely curved outwardly from said center bar.

References Cited

UNITED STATES PATENTS

| | | | |
|---|---|---|---|
| 2,983,008 | 5/1961 | Von Rath | 24—73 |
| 3,029,486 | 4/1962 | Raymond | 24—73 |

WILLIAM FELDMAN, *Primary Examiner.*

E. SIMONSEN, *Assistant Examiner.*